United States Patent
Chen

(10) Patent No.: US 9,178,385 B2
(45) Date of Patent: Nov. 3, 2015

(54) BACKUP POWER CONTROL SYSTEM

(71) Applicant: Pegatron Corporation, Taipei (TW)

(72) Inventor: Hao-Chieh Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 417 days.

(21) Appl. No.: 13/665,967

(22) Filed: Nov. 1, 2012

(65) Prior Publication Data

US 2013/0113288 A1 May 9, 2013

(30) Foreign Application Priority Data

Nov. 3, 2011 (TW) ............................... 100140171 A

(51) Int. Cl.
*H02J 9/06* (2006.01)
(52) U.S. Cl.
CPC ................ *H02J 9/06* (2013.01); *Y10T 307/615* (2015.04)
(58) Field of Classification Search
CPC ............. H02J 9/062; H02J 9/061; H02J 9/06; H02J 9/08; H01H 2300/018
USPC .......................................................... 307/64
See application file for complete search history.

(56) References Cited

U.S. PATENT DOCUMENTS

| | | | |
|---|---|---|---|
| 6,253,330 B1 * | 6/2001 | Denkin et al. ................. | 713/300 |
| 2002/0039034 A1 * | 4/2002 | Kohda .......................... | 326/123 |
| 2003/0066759 A1 * | 4/2003 | Hardee et al. ................. | 205/565 |
| 2003/0132669 A1 * | 7/2003 | Bahl et al. ..................... | 307/52 |
| 2003/0193244 A1 * | 10/2003 | Dodson ......................... | 307/53 |
| 2005/0046399 A1 * | 3/2005 | Gan et al. ...................... | 323/222 |
| 2005/0060587 A1 * | 3/2005 | Hwang et al. ................. | 713/300 |
| 2005/0088043 A1 * | 4/2005 | Feng et al. .................... | 307/64 |
| 2007/0296479 A1 * | 12/2007 | Takahashi ..................... | 327/277 |
| 2008/0024011 A1 * | 1/2008 | Chen ............................. | 307/80 |
| 2008/0180078 A1 * | 7/2008 | Hiasa ............................ | 323/282 |
| 2009/0019294 A1 * | 1/2009 | Chen ............................ | 713/300 |
| 2009/0295228 A1 * | 12/2009 | Ochi ............................. | 307/66 |
| 2011/0010568 A1 * | 1/2011 | Kageyama et al. ........... | 713/300 |
| 2011/0227548 A1 * | 9/2011 | Tsai .............................. | 323/282 |
| 2011/0255311 A1 * | 10/2011 | Hsu et al. .................... | 363/21.15 |
| 2012/0080953 A1 * | 4/2012 | Wang ............................ | 307/72 |
| 2012/0151242 A1 * | 6/2012 | McGrath et al. ............. | 713/340 |

* cited by examiner

*Primary Examiner* — Thienvu Tran
*Assistant Examiner* — Brian K Baxter
(74) *Attorney, Agent, or Firm* — McClure, Qualey & Rodack, LLP

(57) ABSTRACT

A backup power control system includes a main power supply unit, a first negative feedback circuit unit, a standby power supply unit, a second negative feedback circuit unit, and a control unit. The main power supply unit is suitable for outputting a main power. The standby power supply unit is suitable for outputting a standby power. The control unit switches the first negative feedback circuit unit and the second negative feedback circuit unit to be turned on or not to be turned on in response to whether a normal power supply signal of the main power is received. When the normal power supply signal is received, the control unit enables the first negative feedback circuit unit to be turned on and enables the second negative feedback circuit unit not to be turned on.

8 Claims, 4 Drawing Sheets

BACKUP POWER CONTROL SYSTEM

CROSS-REFERENCES TO RELATED APPLICATIONS

This non-provisional application claims priority under 35 U.S.C. §119(a) on Patent Application No. 100140171 filed in Taiwan, R.O.C. on 2011/11/03, the entire contents of which are hereby incorporated by reference.

BACKGROUND OF THE INVENTION

1. Technical Field

The present invention relates to a power control technology, and particularly to a backup power control system.

2. Related Art

For a conventional backup power architecture, reference may be made to the Republic of China Patent Publication No. I331714 named "BACKUP POWER SUPPLY SYSTEM". It can be seen from the content disclosed in the foregoing application that a traditional diode is used for switching and turning on the power backup, so that the power consumption of the diode is too high, resulting in overheating and low electricity conversion efficiency, and an element damage rate of the system may be increased due to the difficulty in heat dissipation.

For another conventional backup power architecture, reference may be made to the Republic of China Patent Publication No. I271910 named "ACTIVE OR GATE PROCESSING CONTROLLER FOR REDUNDANT POWER SYSTEM". It can be seen from the content disclosed in the application that isolation protection cannot be provided. That is to say, in the foregoing application, in order meet the safety requirements, voltage-proof elements with enough insulation strength must be used. For the design of a system of a reduced size, the design is difficult and the cost is high.

SUMMARY

An embodiment of the present invention provides a backup power control system, including a main power supply unit, a first negative feedback circuit unit, a standby power supply unit, a second negative feedback circuit unit, and a control unit. The main power supply unit is suitable for outputting a main power. The first negative feedback circuit unit is coupled to a negative end of the main power supply unit. The standby power supply unit is suitable for outputting a standby power. The second negative feedback circuit unit is coupled to a negative end of the standby power supply unit. The control unit switches the first negative feedback circuit unit and the second negative feedback circuit unit to be turned on or not to be turned on in response to whether a normal power supply signal of the main power is received. When the normal power supply signal is received, the control unit enables the first negative feedback circuit unit to be turned on and enables the second negative feedback circuit unit not to be turned on. When the normal power supply signal is not received, the control unit enables the first negative feedback circuit unit not to be turned on and enables the second negative feedback circuit unit to be turned on, so that the standby power is supplied.

In an embodiment of the present invention, the control unit includes a power monitoring unit and an isolation control unit. The power monitoring unit receives the normal power supply signal of the main power, and the power monitoring unit generates a current variation signal according to whether the normal power supply signal of the main power is received. The isolation control unit turns on one of the first negative feedback circuit unit and the second negative feedback circuit unit in response to the current variation signal.

In an embodiment of the present invention, the power monitoring unit includes a TL431-type triode.

In an embodiment of the present invention, the first negative feedback circuit unit includes a first delay unit, a first switching unit and a first anti-backflow unit connected in series, and the second negative feedback circuit unit includes a second delay unit, a second switching unit and a second anti-backflow unit connected in series.

In an embodiment of the present invention, the second switching unit is a third Metal Oxide Semiconductor (MOS) transistor, the second anti-backflow unit is a fourth MOS transistor, a source of the third MOS transistor is coupled to the second delay unit, a drain of the third MOS transistor is connected to a drain of the fourth MOS transistor, a source of the fourth MOS transistor is coupled to a first grounding reference point, and a gate of the third MOS transistor and a gate of the fourth MOS transistor are connected together and controlled by the isolation control unit.

In an embodiment of the present invention, the isolation control unit includes a first photocoupler, a second photocoupler, and a third photocoupler. The first photocoupler, the second photocoupler, and the third photocoupler are in response to the current variation signal, so that the first photocoupler is used to control operation of the first MOS transistor and the second MOS transistor, the second photocoupler is used to control operation of the third MOS transistor and the fourth MOS transistor, and the third photocoupler is used to control running of the second delay unit.

In an embodiment of the present invention, the isolation control unit further includes a fourth photocoupler. The fourth photocoupler transfers an optically coupled signal in response to the current variation signal to enable a light-emitting diode to emit light or to announce a Central Processor which is outside of the backup power control system to know the state of power supply.

In an embodiment of the present invention, the main power supply unit is an Alternating Current (AC)-to-Direct Current (DC) supply unit and the standby power supply unit is a DC-to-DC supply unit.

Based on the previous description, in the backup power control system of the embodiments of the present invention, the output of the main power supply unit has a current path flowing to the negative end, and the output of the standby power supply unit also has a current path flowing to the negative end. In the present invention, one of the two current paths flowing to the negative end is controlled to be turned on, in which the two current paths flowing to the negative end are configured with the first negative feedback circuit unit and the second negative feedback circuit unit respectively, so the main power supply unit or the standby power supply unit supplies power, thereby effectively solving the conventional too large power consumption problem derived by adopting the diode. In another aspect, in the power supply process of the present invention, the negative current path of the active/standby power supply unit is switched, and the first/second negative feedback circuit unit can effectively provide isolation protection and prevent current backflow.

In order to make the features and advantages of the present invention more comprehensible, the present invention is described in detail below with reference to embodiments and the accompanying drawings.

BRIEF DESCRIPTION OF THE DRAWINGS

The following accompanying drawings are a part of the specification of the present invention and show exemplary embodiments of the present invention. The principle of the present invention is described in combination with the accompanying drawings and specification.

DETAILED DESCRIPTION

Figure 1:
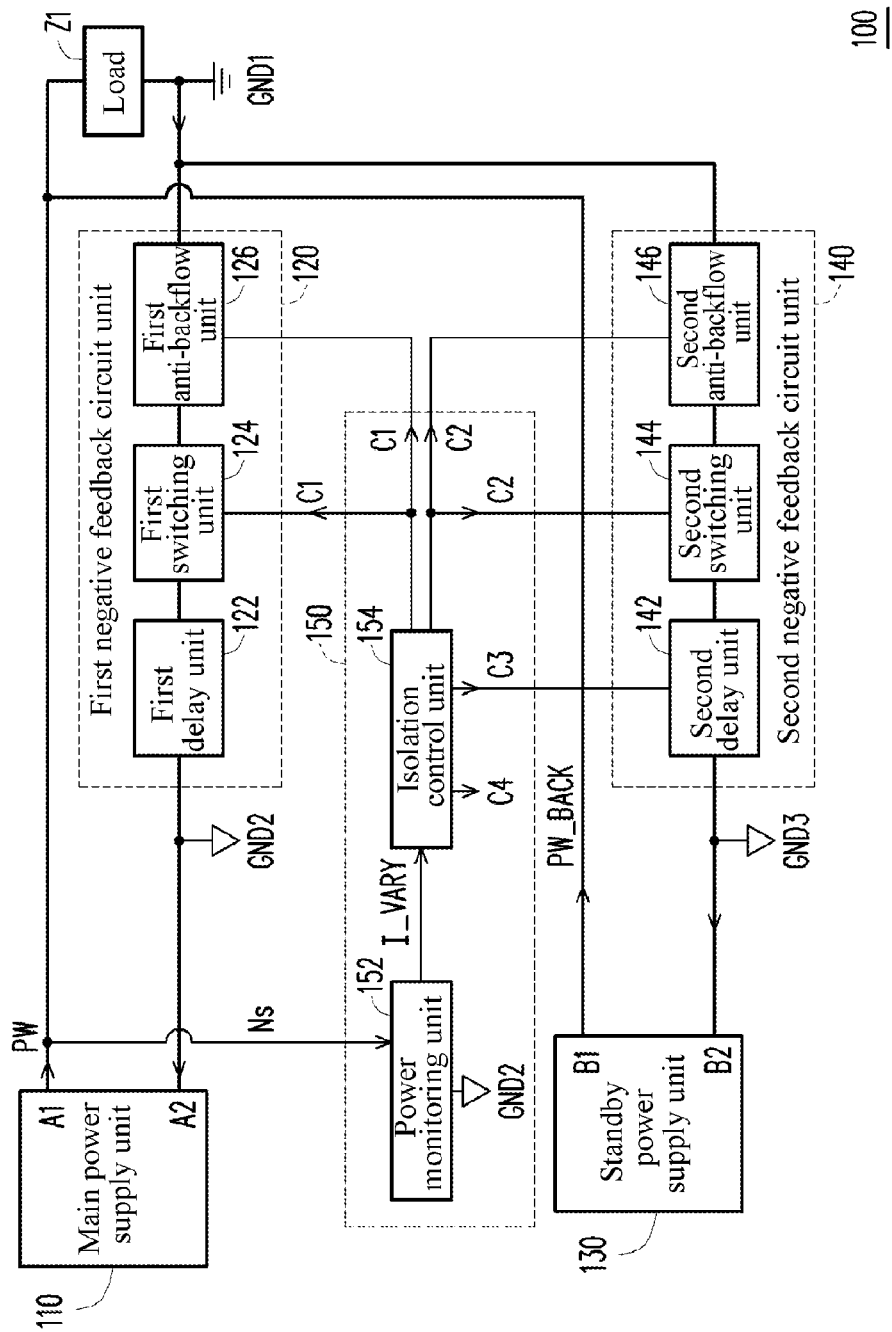
FIG. 1 is a schematic diagram of a backup power control system 100 according to an embodiment of the present invention.

Reference may now be made to embodiments of the present invention in detail, and examples of the embodiments are described in the accompanying drawings. Additionally, wherever possible, in the drawings and detailed description an element/component with the same reference number represents the same or similar part.

FIG. 1 is a schematic diagram of a backup power control system 100 according to an embodiment of the present invention. Please refer to FIG. 1, in which the backup power control system 100 includes a main power supply unit 110, a first negative feedback circuit unit 120, a standby power supply unit 130, a second negative feedback circuit unit 140, and a control unit 150. The main power supply unit 110 is suitable for outputting a main power PW, so as to supply power to a load Z1. The main power supply unit 110 may generate a stable main power PW by using an AC-to-DC supply unit. For example, the main power supply unit 110 may be an AC to 12 V supply unit, but the present invention is not limited thereto. The AC-to-DC supply unit is an electronic device well known by persons of ordinary skill in the art, and the details are not described here again.

Output ends of the main power supply unit 110 have a positive end A1 and a negative end A2. When the main power PW is output, an output current flows from the positive end A1 to the load Z1, and then returns to the main power supply unit 110 through a current path flowing to the negative end A2, in which the current path flowing to the negative end A2 refers to a path via the first negative feedback circuit unit 120. The first negative feedback circuit unit 120 is coupled between the negative end A2 of the main power supply unit 110 and the load Z1. Moreover, the negative end A2 may be connected to a second grounding reference point GND2, and the load Z1 is coupled between the positive end A1 and a first grounding reference point GND1, in which the first grounding reference point GND1 is different from the second grounding reference point GND2.

The standby power supply unit 130 is suitable for outputting a standby power PW_BACK to the load Z1 only when the main power supply unit cannot supply power. The standby power supply unit 130 may generate a stable standby power PW_BACK by using a DC-to-DC supply unit. For example, the standby power supply unit 130 may be a 48 V to 12 V supply unit or a 48 V to 5 V supply unit, but the present invention is not limited thereto. The DC-to-DC supply unit is an electronic device well known by persons of ordinary skill in the art, and the details are not described here again.

Output ends of the standby power supply unit 130 have a positive end B1 and a negative end B2. When the standby power PW_BACK is output, an output current flows from the positive end B1 to the load Z1, and then returns to the standby power supply unit 130 through a current path flowing to the negative end B2, in which the current path flowing to the negative end B2 refers to a path via the second negative feedback circuit unit 140. The second negative feedback circuit unit 140 is coupled between the negative end B2 of the standby power supply unit 130 and the load Z1. Moreover, the negative end B2 may be coupled to a third grounding reference point GND3, and the load Z1 is coupled between the positive end B1 and the first grounding reference point GND1, in which the third grounding reference point GND3 is different from the first grounding reference point GND1 and the third grounding reference point GND3 is different from the second grounding reference point GND2.

The control unit 150 may switch the first negative feedback circuit unit 120 and the second negative feedback circuit unit 140 in response to whether a normal power supply signal Ns of the main power PW is received, so as to decide that one of the first negative feedback circuit unit 120 and the second negative feedback circuit unit 140 is turned on and the other is not turned on. In the case of receiving the normal power supply signal Ns, the control unit 150 enables the first negative feedback circuit unit 120 to be turned on and enables the second negative feedback circuit unit 140 not to be turned on. In the case of not receiving the normal power supply signal Ns, the control unit 150 enables the first negative feedback circuit unit 120 not to be turned on and enables the second negative feedback circuit unit 140 to be turned on. In this way, the standby power PW_BACK is supplied to the load Z1.

It can be clearly known from the above description that in the power supply process, the control unit 150 can switch the current path flowing to the negative end in response to whether the normal power supply signal Ns is received. Consequently, when the main power PW is cut off, the standby power PW_BACK can be switched to in a seamless manner, so normal work power is supplied to the load Z1 in any case.

Figure 2:
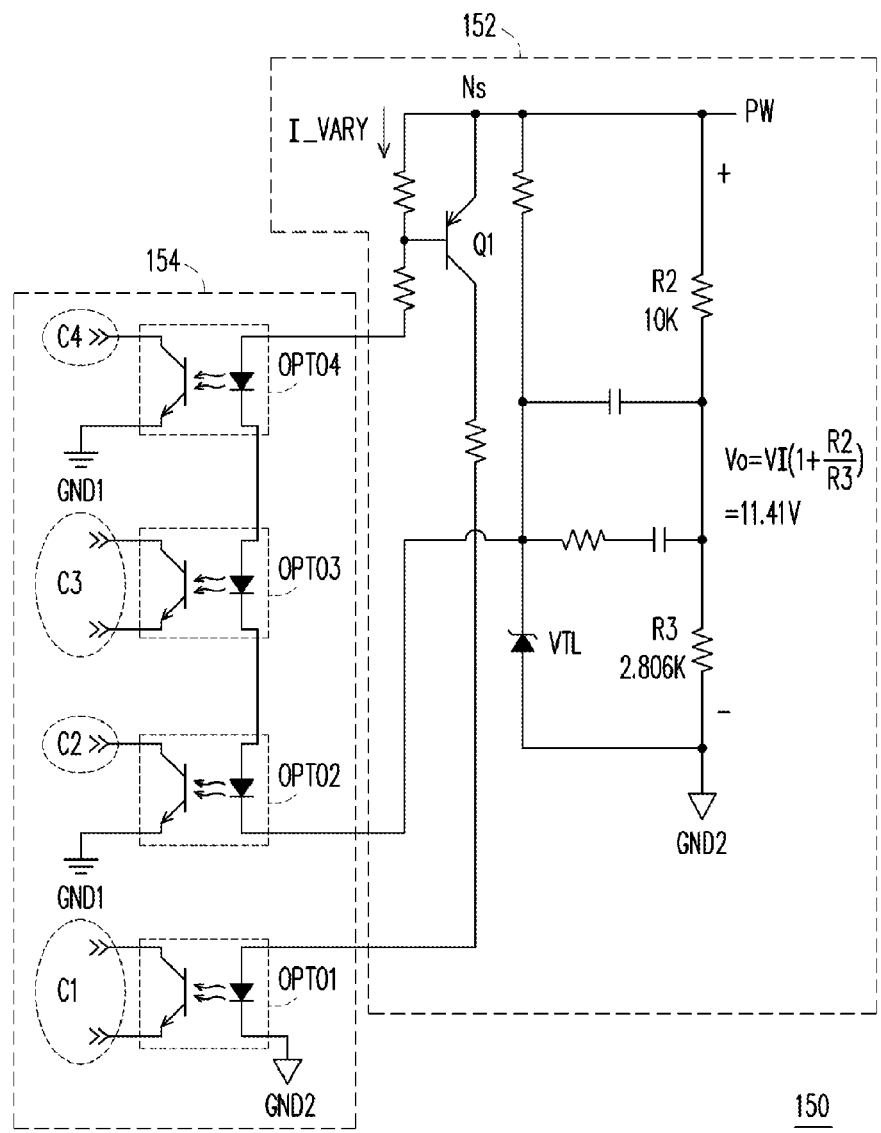
FIG. 2 is a circuit diagram of a control unit 150 according to an embodiment of the present invention.

In order to further describe details of the control unit 150 of the backup power control system 100, the present invention is described below with another embodiment. FIG. 2 is a circuit diagram of a control unit 150 according to an embodiment of the present invention. Reference is made to both FIG. 1 and FIG. 2.

The control unit 150 includes a power monitoring unit 152 and an isolation control unit 154. The power monitoring unit 152 is used to receive a normal power supply signal Ns of a main power PW, and generate a current variation signal I_VARY according to whether the normal power supply signal Ns is received. The power monitoring unit 152 is formed by a TL431-type triode VTL, resistors R2 and R3, a transistor Q1, and a capacitor. An end of R3 is connected to the second grounding reference point GND2. In this embodiment, the TL431-type triode VTL may be configured to a circuit form having a reference voltage and a monitoring power. Based on element characteristics of the TL431-type triode VTL, the designed reference voltage may be represented as Vo=VI×(1+R2/R3), where VI is a reference voltage in the TL431-type triode VTL, and R2 and R3 may represent resistance values of the depicted resistors R2 and R3 respectively. For example, when a value of VI is 2.5 V, a value of R2 is 10 KΩ, and a value of R3 is 2.806 KΩ, the reference voltage may be set to Vo=2.5×(1+10 K/2.806 K)=11.41 V.

Figure 3:
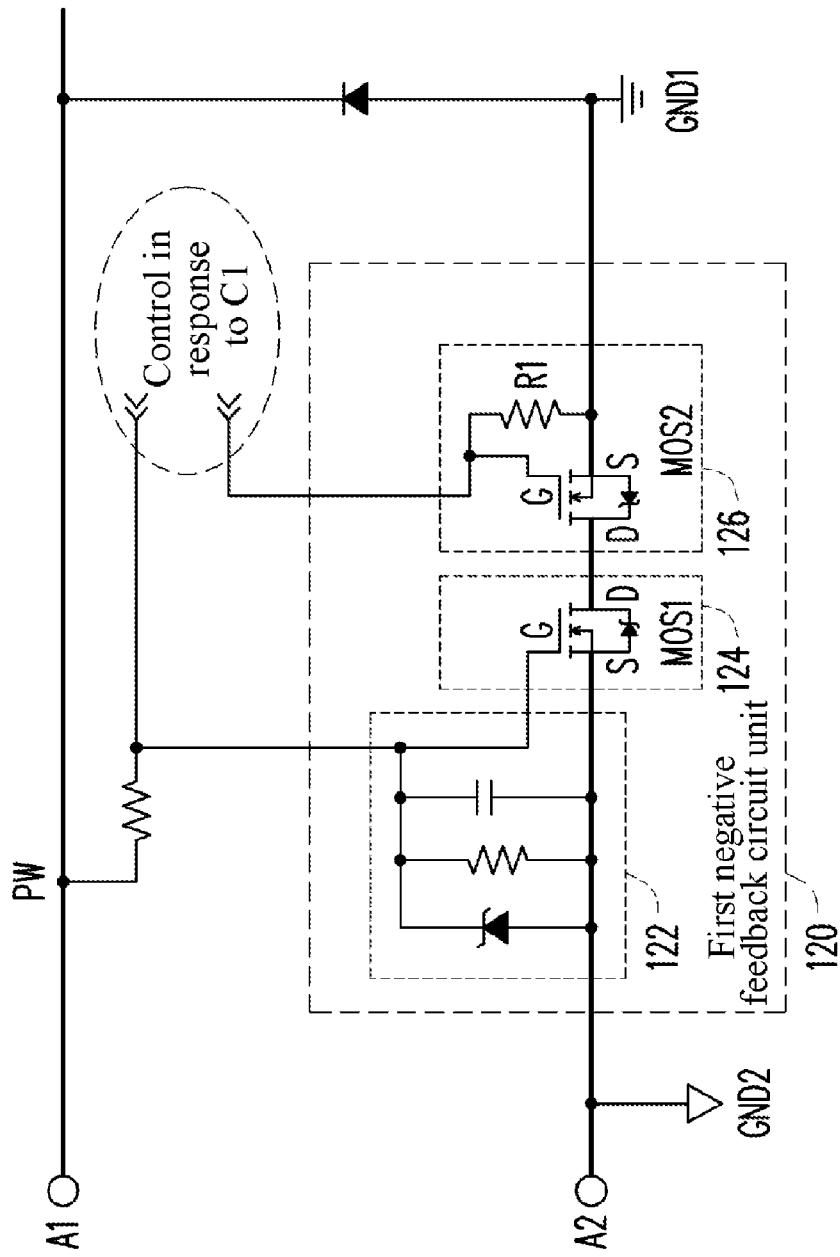
FIG. 3 is a circuit diagram of a first negative feedback circuit unit 120 according to an embodiment of the present invention.

The power monitoring unit 152 mainly uses the TL431-type triode VTL. The TL431-type triode VTL itself may be used as a voltage stabilizer and may also be used as a constant voltage source. In this embodiment, the circuit formed by the TL431-type triode VTL may be used to generate a weak current variation, so as to monitor whether the normal power supply signal Ns exists. However, the content of the power monitoring unit 152 depicted in FIG. 3 is only an example for the purpose of description, but is not intended to limit other possible configurations of the TL431-type triode VTL and elements such as the resistor and capacitor. The reference voltage may be adjusted according to an actual circuit.

It is assumed that a normal value of a main power PW is 12 V. When a potential of the main power PW is about 12 V (not less than 11.41 V), the power monitoring unit 152 receives a voltage of 12V. Since Ns is greater than the reference voltage 11.41 V, the TL431-type triode VTL judges that a normal power supply signal Ns is received, so as to enable the transistor Q1 to be turned on, and generate and output a current variation signal I_VARY. The advantage of using the transistor Q1 is that a comparator is not used. In contrast, the cost of the transistor Q1 is low, and the circuit area occupied by the transistor Q1 is small. When the main power PW is cut off, that is, the power monitoring unit 152 receives a voltage of lower than 11.41 V, since Ns is smaller than the reference voltage 11.41 V, the TL431-type triode VTL judges that the normal power supply signal Ns is not received, so as to enable the transistor Q1 not to be turned on, and not to generate and output a current variation signal I_VARY.

In this embodiment, the isolation control unit 154 may be used to enable one of the first negative feedback circuit unit 120 and the second negative feedback circuit unit 140 to be turned on in response to the current variation signal I_VARY.

Figure 4:
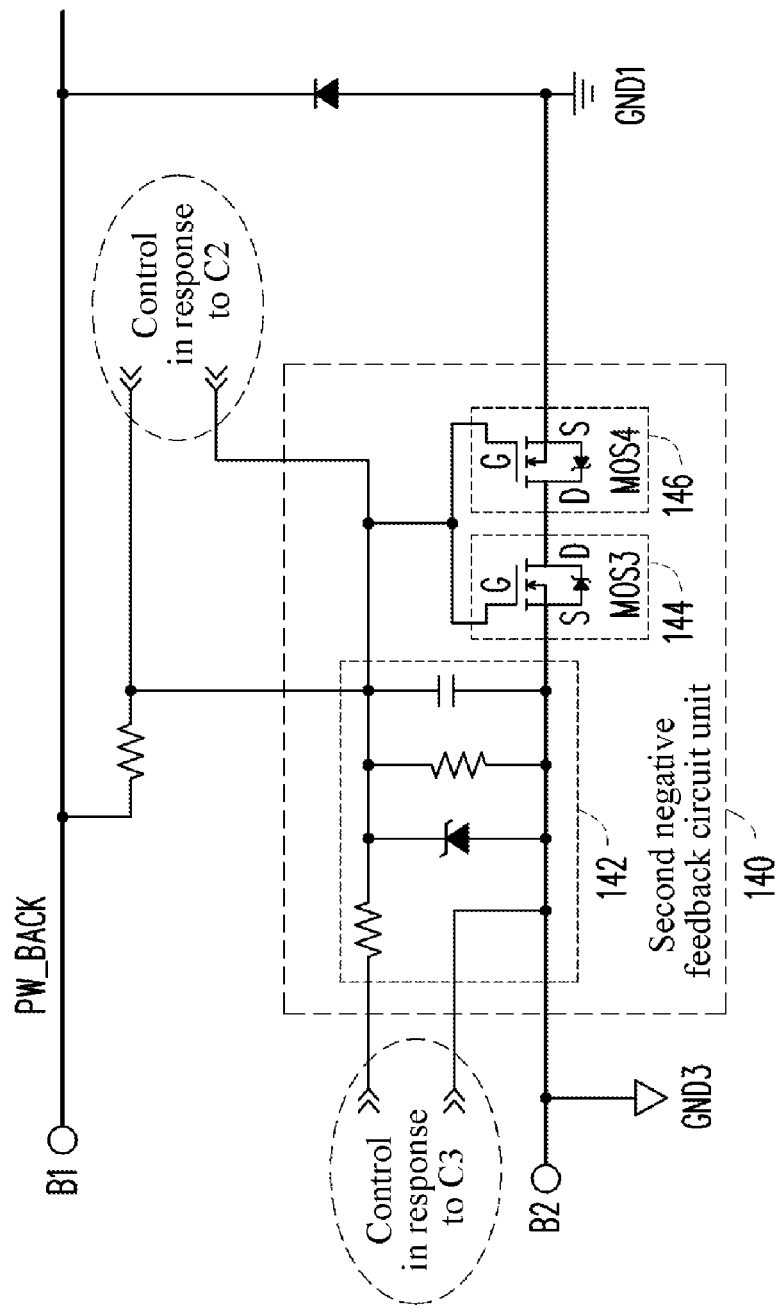
FIG. 4 is a circuit diagram of a second negative feedback circuit unit 140 according to an embodiment of the present invention.

In this embodiment, the isolation control unit 154 may include a first photocoupler OPTO1, and a second photocoupler OPTO2 and a third photocoupler OPTO3 connected in series. In the case that the main power PW is normally supplied and the transistor Q1 is turned on, in response to the current variation signal I_VARY, the first photocoupler OPTO1 generates an optically coupled signal C1, capable of controlling running of a first MOS transistor MOS1 and a second MOS transistor MOS2 (as depicted in FIG. 3), the second photocoupler OPTO2 generates an optically coupled signal C2, capable of controlling running of a third MOS transistor MOS3 and a fourth MOS transistor MOS4 (as depicted in FIG. 4), and the third photocoupler OPTO3 generates an optically coupled signal C3, capable of controlling running of a second delay unit 142 (as depicted in FIG. 4).

In another embodiment, the isolation control unit 154 further includes a fourth photocoupler OPTO4, and the fourth photocoupler OPTO4 are connected to the second and third photocouplers OPTO2 and OPTO3 in series. The fourth photocoupler OPTO4 may generate and transfer an optically coupled signal C4 in response to the current variation signal I_VARY. The optically coupled signal C4 may be used to enable a light-emitting diode to emit light or not to emit light, or enable an alarming device to sound, or notify a host outside the backup power control system 100 of a current state of power supply. The advantage of notifying the host as an example is that the central processor can know the current state of power supply without being enrolled in switch control.

Furthermore, the first to fourth photocouplers OPTO1-OPTP4 are of isolation (separation), architecture. An end of a transmission module (at a primary side), of the first photocoupler OPTO1 is connected to the second grounding reference point GND2, an end of a transmission module (at a primary side), of the second photocoupler OPTO2 is coupled to the second grounding reference point GND2, ends of receiving modules (at a secondary side), of the second and fourth photocoupler OPTO2 and OPTO4 are connected to the first grounding reference point GND1. The transmission module at the primary side and the receiving module at the secondary side do not share the same grounding reference point, so that the photocoupler can be effectively isolated from a controlled end.

It can be clearly known from the previous description that, the backup power control system 100 performs feedback control by using the control unit 150 formed by the TL431-type triode VTL and the photocoupler. The first to fourth photocouplers OPTO1 to OPTP4 are of isolation (separation), architecture, can be used to control the controlled end, and have an isolation effect. A detection manner is adopted to only detect the potential of the main power PW, but does not detect the main power PW and the standby power PW_BACK at the same time. When the main power supply unit 110 does not supply power, the control unit 150 immediately switches to the standby power supply unit 130 for power supply, so the control unit 150 can ensure that the load Z1 is continuously supplied with power.

Please refer to FIG. 1 again, in which embodiment the first negative feedback circuit unit 120 includes a first delay unit 122, a first switching unit 124 and a first anti-backflow unit 126 connected in series. The second negative feedback circuit unit 140 includes a second delay unit 142, a second switching unit 144 and a second anti-backflow unit 146 connected in series.

In the case that the main power PW is normal, the isolation control unit 154 sends an optically coupled signal C1, to enable the first switching unit 124 and the first anti-backflow unit 126 to be turned on. The primary side of the isolation control unit 154 has a current, so the secondary side presents low impedance due to element characteristics. The second delay unit 142 generates an approximately short circuit effect in response to control of the optically coupled signal C3. Furthermore, the isolation control unit 154 sends an optically coupled signal C2, to enable the second switching unit 144 and the second anti-backflow unit 146 not to be turned on.

In the case that the main power PW is cut off, the isolation control unit 154 sends an optically coupled signal C1, to enable the first switching unit 124 and the first anti-backflow unit 126 not to be turned on, and the isolation control unit 154 sends an optically coupled signal C2, to enable the second switching unit 144 and the second anti-backflow unit 146 to be turned on, so that the standby power PW_BACK is supplied to the load Z1. When the first anti-backflow unit 126 or the second anti-backflow unit 146 is not turned on, an effect of preventing current backflow exists.

FIG. 3 is a circuit diagram of a first negative feedback circuit unit 120 according to an embodiment of the present invention. Reference is made to FIG. 1 and FIG. 3. The first delay unit 122 is formed by a Zener diode, a capacitor, and a resistor. The first switching unit 124 may be a first MOS transistor MOS1. The first anti-backflow unit 126 includes a second MOS transistor MOS2 and a first resistor R1. A source of the first MOS transistor MOST is coupled to the first delay unit 122 and to the first grounding reference point GND2, a drain of the first MOS transistor MOS1 is coupled to a drain of the second MOS transistor MOS2, a source of the second MOS transistor MOS2 is coupled to the first grounding reference point GND1, and the first resistor R1 is connected between the source and a gate of the second MOS transistor MOS2.

A gate of the first MOS transistor MOS1 and the gate of the second MOS transistor MOS2 receive an optically coupled signal C1, so as to be controlled by the isolation control unit 154 in response to the optically coupled signal C1. When the optically coupled signal C1 has no potential, the gate of the second MOS transistor MOS2 is forced to be connected to the first grounding reference point GND1, Vgs of MOS2 is equal to 0, so that the second MOS transistor MOS2 is turned off. The purpose of disposing the first resistor R1 is to turn off the second MOS transistor MOS2. Consequently, when the normal power supply signal Ns is not received, the first negative feedback circuit unit 120 can effectively provide isolation protection and can prevent current backflow.

FIG. 4 is a circuit diagram of a second negative feedback circuit unit 140 according to an embodiment of the present invention. Reference is made to FIG. 1 and FIG. 4. The second delay unit 142 is formed by a Zener diode, a capacitor, and a resistor. The second switching unit 144 may be a third MOS transistor MOS3. The second anti-backflow unit 146 may be a fourth MOS transistor MOS4. A source of the third MOS transistor MOS3 is coupled to the second delay unit 142 and to the third grounding reference point GND3, a drain of the third MOS transistor MOS3 is connected to a drain of the fourth MOS transistor MOS4, and a source of the fourth MOS transistor MOS4 is coupled to the first grounding reference point GND1. A gate of the third MOS transistor MOS3 and a gate of the fourth MOS transistor MOS4 are connected together and receive an optically coupled signal C2, so as to be controlled by the isolation control unit 154 in response to the optically coupled signal C2. Consequently, when the normal power supply signal Ns is received, the second negative feedback circuit unit 140 can effectively provide isolation protection and can prevent current backflow.

In sum, in the backup power control system of the present invention, the output of the main power supply unit has a current path flowing to the negative end, and the output of the standby power supply unit also has a current path flowing to the negative end. In the present invention, one of the two current paths flowing to the negative end is controlled to be turned on, in which the two current paths flowing to the negative end are configured with the first negative feedback circuit unit and the second negative feedback circuit unit respectively, so the main power supply unit or the standby power supply unit supplies power. When the main power supply unit supplies power to the load, the standby power supply unit is not affected, and when the standby power supply unit supplies power to the load, the main power supply unit is not affected. By this means, the conventional problem of too large power consumption derived by adopting the diode can be solved effectively. In another aspect, in the power supply process of the present invention, the negative current path of the active/standby power supply unit is switched, and the first/second negative feedback circuit unit can effectively provide isolation protection and prevent current backflow.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A backup power control system, comprising:
   a main power supply unit, suitable for outputting a main power;
   a first negative feedback circuit unit, coupled to a negative end of the main power supply unit;
   a standby power supply unit, suitable for outputting a standby power;
   a second negative feedback circuit unit, coupled to a negative end of the standby power supply unit; and
   a control unit, for switching the first negative feedback circuit unit and the second negative feedback circuit unit to be turned on or not to be turned on in response to whether a normal power supply signal of the main power is received,
   wherein the control unit comprises:
      a power monitoring unit, for receiving the normal power supply signal of the main power, wherein the power monitoring unit generates a current variation signal according to whether the normal power supply signal of the main power is received; and
      an isolation control unit, for turning on one of the first negative feedback circuit unit and the second negative feedback circuit unit in response to the current variation signal;
   wherein the first negative feedback circuit unit comprises a first delay unit, a first switching unit and a first anti-backflow unit connected in series, and the second negative feedback circuit unit comprises a second delay unit, a second switching unit and a second anti-backflow unit connected in series,
   wherein when the normal power supply signal is received, the control unit enables the first negative feedback circuit unit to be turned on and enables the second negative feedback circuit unit not to be turned on, and when the normal power supply signal is not received, the control unit enables the first negative feedback circuit unit not to be turned on and enables the second negative feedback circuit unit to be turned on, so that the standby power is supplied.

2. The backup power control system according to claim 1, wherein the power monitoring unit comprises a TL431-type triode.

3. The backup power control system according to claim 1, wherein the main power supply unit is an Alternating Current (AC)-to-Direct Current (DC) supply unit and the standby power supply unit is a DC-to-DC supply unit.

4. The backup power control system according to claim 1, wherein in the case that the main power is normal, the isolation control unit enables the first switching unit and the first anti-backflow unit to be turned on, enables the second delay unit to generate an approximately short circuit effect, and enables the second switching unit and the second anti-backflow unit not to be turned on;
   in the case that the main power is cut off, the isolation control unit enables the first switching unit and the first anti-backflow unit not to be turned on, and enables the second switching unit and the second anti-backflow unit to be turned on, so that the standby power is supplied,
   wherein when the first anti-backflow unit or the second anti-backflow unit is not turned on, an effect of preventing current backflow exists.

5. The backup power control system according to claim 4, wherein the first switching unit is a first Metal Oxide Semiconductor (MOS) transistor, the first anti-backflow unit comprises a second MOS transistor and a first resistor, a source of the first MOS transistor is coupled to the first delay unit, a drain of the first MOS transistor is connected to a drain of the second MOS transistor, a source of the second MOS transistor is coupled to a first grounding reference point, the first resistor is connected between the source and a gate of the second MOS transistor, and a gate of the first MOS transistor and the gate of the second MOS transistor are controlled by the isolation control unit.

6. The backup power control system according to claim 5, wherein the second switching unit is a third MOS transistor, the second anti-backflow unit is a fourth MOS transistor, a source of the third MOS transistor is coupled to the second delay unit, a drain of the third MOS transistor is connected to a drain of the fourth MOS transistor, a source of the fourth MOS transistor is coupled to a first grounding reference point, and a gate of the third MOS transistor and a gate of the fourth MOS transistor are connected together and controlled by the isolation control unit.

7. The backup power control system according to claim 6, wherein the isolation control unit comprises a first photocoupler, a second photocoupler, and a third photocoupler, the first photocoupler, the second photocoupler, and the third photocoupler are in response to the current variation signal, so that the first photocoupler is used to control running of the first MOS transistor and the second MOS transistor, the second photocoupler is used to control running of the third MOS transistor and the fourth MOS transistor, and the third photocoupler is used to control running of the second delay unit.

8. The backup power control system according to claim 7, wherein the isolation control unit further comprises a fourth photocoupler, and the fourth photocoupler transfers an optically coupled signal in response to the current variation signal, to enable a light-emitting diode to emit light, or announce a Central Processor which is outside of the backup power control system to know the state of power supply.

* * * * *